US008739776B2

(12) United States Patent
Ezawa et al.

(10) Patent No.: US 8,739,776 B2
(45) Date of Patent: Jun. 3, 2014

(54) SOLAR LIGHT CONDENSING SYSTEM

(75) Inventors: Kazuaki Ezawa, Chou-ku (JP);
Nobuyuki Tsutsui, Tamano (JP);
Suminao Tomoyasu, Tamano (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 0 days.

(21) Appl. No.: 13/392,249

(22) PCT Filed: Aug. 23, 2010

(86) PCT No.: PCT/JP2010/064176
§ 371 (c)(1),
(2), (4) Date: Feb. 24, 2012

(87) PCT Pub. No.: WO2011/024755
PCT Pub. Date: Mar. 3, 2011

(65) Prior Publication Data
US 2012/0152235 A1   Jun. 21, 2012

(30) Foreign Application Priority Data
Aug. 24, 2009   (JP) ................... 2009-192671

(51) Int. Cl.
*F24J 2/02*   (2006.01)
(52) U.S. Cl.
USPC ........... 126/663; 126/422; 126/680; 126/681; 126/271; 350/167; 60/641
(58) Field of Classification Search
USPC .......... 126/663, 681–684, 270–271; 165/110, 165/149; 60/641.8, 641.5
See application file for complete search history.

(56) References Cited

U.S. PATENT DOCUMENTS

| | | | | |
|---|---|---|---|---|
| 3,924,604 A * | 12/1975 | Anderson | ...................... | 126/606 |
| 4,029,077 A * | 6/1977 | Gorniak | ......................... | 126/698 |
| 4,212,290 A * | 7/1980 | Warnken | ....................... | 126/684 |
| 4,485,803 A * | 12/1984 | Wiener | ........................... | 126/591 |
| 4,537,156 A * | 8/1985 | Rees | ................................. | 122/6 A |
| 5,341,870 A * | 8/1994 | Hughes et al. | ................ | 165/110 |
| 5,979,438 A * | 11/1999 | Nakamura | .................... | 126/680 |
| 2009/0173337 A1 | 7/2009 | Tamaura et al. | | |
| 2011/0197584 A1* | 8/2011 | Ezawa et al. | ............... | 60/641.11 |

FOREIGN PATENT DOCUMENTS

| | | |
|---|---|---|
| JP | 51-24434 A | 2/1976 |
| JP | 53-13041 A | 2/1978 |
| JP | 57-13127 | 1/1982 |
| JP | 58-116956 | 8/1983 |

(Continued)

Primary Examiner — Steven B McAllister
Assistant Examiner — Nikhil Mashruwala
(74) Attorney, Agent, or Firm — Westerman, Hattori, Daniels & Adrian, LLP

(57) ABSTRACT

Problem to be Solved The present invention is made in view of the above-described circumstances. An object of the present invention is to provide a sunlight collecting system achieving suppression of power generation cost with the receiver which enables suppressing the manufacturing, transportation and construction costs, facilitating recovery work in the case of occurrence of a failure, and promptly recovering a heating medium circulating inside the receiver in an emergency.
Means for Solving the Problem A sunlight collecting system in which sunlight is reflected by a plurality of heliostats onto a heat receiving portion having a heating medium circulated therein and then energy is drawn from the heating medium, characterized in that the sunlight collecting system is configured such that: the heat receiving portion is formed by assembling a plurality of modules, each of the modules includes an upper header, a lower header, and a plurality of heat receiving tubes connecting the two headers, and the heating medium circulates in the modules.

3 Claims, 5 Drawing Sheets

(56) References Cited

FOREIGN PATENT DOCUMENTS

| JP | 63-243463 A | 10/1988 |
| JP | 11-119105 A | 4/1999 |
| JP | 2951297 B2 | 9/1999 |
| JP | 2009-150360 A | 7/2009 |
| WO | WO 2006/025449 A1 | 3/2006 |

* cited by examiner

SOLAR LIGHT CONDENSING SYSTEM

CROSS-REFERENCE TO RELATED APPLICATIONS

The present patent application is a nationalization of International application No. PCT/JP2010/064176, filed Aug. 23, 2010, published in Japanese, which is based on, and claims priority from, Japanese Application No. JP2009-192671 filed Aug. 24, 2009, both of which are incorporated herein by reference in their entireties.

TECHNICAL FIELD

The present invention relates to a sunlight collecting system in which sunlight reflected by multiple heliostats (reflection mirrors) is converged to a receiver (heat receiving portion), and a heating medium circulates in the receiver.

BACKGROUND ART

Nowadays, there is a growing concern about depletion and rising cost of oil resources, and studies are conducted on transition to new energy resources from oil resources being one of the reasons for the global warming. One of new energy sources is solar thermal power generation in which sunlight is collected and used as energy.

As the sunlight collecting system, a beam-down sunlight collecting system is known in which sunlight is reflected by heliostats being reflection mirrors toward above a center portion of the system and the reflected light is converged to a receiver (heat receiving portion) installed at a lower portion of the system by a large reflection mirror called a center reflector (see Patent Document 1, for example).

The receiver may include pipes and the like in which a heating medium (molten salt or the like, for example) circulates. In this case, the heating medium having received the thermal energy from sunlight at the receiver is configured to be sent to a power generation unit. The power generation unit includes, for example, a power generator which generates steam by utilizing heat of the heating medium and supplies the steam to a steam turbine to generate electricity, and other devices.

As a method for improving power generation efficiency with use of the sunlight collecting system, an invention in which a heat collecting receiver is formed in a pot shape (in the shape of a cavity) is disclosed (see Patent Document 2). The invention described in Patent Document 2 is configured such that sunlight having entered the pot is reflected multiple times to transfer heat to the heating medium efficiently and that the sunlight is held inside the pot. This configuration significantly increases the efficiency of photovoltaic power generation.

However, the pot-shaped receiver described in cited document 2 has a structure in which a single pipe is shaped into a pot shape, and thus faces problems that manufacturing the receiver is very difficult and the manufacturing costs are high. In addition, the receiver is large in size, and thus transporting the receiver of an integrated type is not easy and constructing the receiver on site is a demanding work.

Further, a failure of the receiver such as a pipe breakage requires the entire receiver to be replaced. When a beam-down sunlight collecting system of 400 m to 500 m square is constructed for example, the diameter of the pot-shaped receiver is about 8 m to 10 m, which is significantly large.

Moreover, sunlight falls on the inside of the receiver unevenly, which causes uneven temperature distribution thereof and thus leads to uneven thermal expansion of the pipe forming the receiver. Hence, there is a problem that the gap appears in the receiver or the pipe expands in a small space resulting in a failure such as a crack in the pipe in some cases.

Further, in the case of a failure of the receiver such as a pipe breakage, the entire receiver needs to be replaced because the receiver is formed of a single pipe, which leads to a large replacement work. In addition, there is a problem of a high cost of preparing the new receiver.

Further, in the sunlight collecting system, molten salt such as sodium nitrate which turns into a liquid phase at 150° C. to 500° C. is most commonly used for the heating medium. When the molten salt is used, the molten salt needs to be withdrawn from the receiver and moved to a thermal insulating tank on a cloudy day and during nighttime. This is because the molten salt, when cooled, is solidified to cause clogging in the receiver tube. When the molten salt is recovered, it takes time to withdraw the molten salt from the receiver formed of a helical pipe described in cited document 2. Particularly, there is a problem that the technique is incapable of dealing with an emergency where the molten salt should be recovered promptly.

PRIOR ART DOCUMENT

Patent Document

Patent Document 1: Japanese patent No. 2951297
Patent Document 2: International patent application publication No. WO2006/025449

SUMMARY OF THE INVENTION

Problem to be Solved by the Invention

The present invention is made in view of the above-described circumstances. An object of the present invention is to provide a sunlight collecting system achieving suppression of power generation cost with the receiver which enables suppressing the manufacturing, transportation and construction costs, facilitating recovery work in the case of occurrence of a failure, and promptly recovering a heating medium circulating inside the receiver in an emergency.

Means for Solving the Problem

To achieve the above object, the sunlight collecting system according to the present invention is a sunlight collecting system in which sunlight is reflected by a plurality of heliostats onto a heat receiving portion having a heating medium circulated therein and then energy is drawn from the heating medium, characterized in that the sunlight collecting system is configured such that: the heat receiving portion is formed by assembling a plurality of modules, each of the modules includes an upper header, a lower header, a plurality of heat receiving tubes connecting the two headers, and the heating medium circulates in the modules.

Because of this structure, the receiver (heat receiving portion) can be formed by assembling the simple modules including the heat receiving tubes and headers, and thus manufacturing the receiver is made easy. In addition, the receiver can be transported separately in modules, and thus transporting the receiver is made easy and the transportation cost can be suppressed. Moreover, assembly of the receiver in on-site construction is made easy. Further, a failure of the receiver such as a pipe breakage requires replacing only the module to be replaced instead of the entire receiver for completion of a repair, and thus repair work is made easy and the costs of replacements can be reduced.

In addition, joining the multiple modules into multiple separate groups instead of joining the multiple modules into one can suppress uneven heating by sunlight. In other words, by performing control of increasing a flow rate of the heating medium of the module of which temperature is rising, and reversely, of decreasing a flow rate of the heating medium of the module of which temperature is not very high, uneven temperature in the receiver can be suppressed.

The above sunlight collecting system is characterized in that the module is formed to be a plate-shaped module having a substantially quadrangular shape in a front view by including the linear upper header, the linear lower header, and the plurality of heat receiving tubes connecting the upper header and the lower header.

Because of this structure, the module has a simple structure, and thus the costs of, for example, manufacturing and transporting the module can be suppressed.

The above sunlight collecting system is characterized in that the plate-shaped module is altered into a three-dimensional module formed such that the lower header is formed in a substantially triangular shape in a planar view, the triangular shape having two bottom corners at the opposite ends of the lower header and a vertex at the center.

Because of this structure, the module can be formed to be a three-dimensional module. Forming the receiver by assembling the multiple three-dimensional modules enables, for example, increasing efficiency of re-reflection of incident sunlight and narrowing the spaces between each two adjacent modules in order not to let sunlight through to the outside, and thus the receiver which is three-dimensional and efficient can be formed. This is the point different from the case of forming the receiver by assembling the plate-shaped modules. Particularly, since the module is made to be three-dimensional using the linear heat receiving tubes which allows high flowability of the heating medium, the three-dimensional modules do not pose a problem that flowability of the heating medium is reduced.

The above sunlight collecting system is characterized in that the three-dimensional module is formed such that a linear distance between the opposite ends of the lower header is shorter than a distance between the opposite ends of the upper header.

Because of this structure, the module can be formed to be a three-dimensional module having a squeezed shape with the lower header made thinner than the upper header. The squeezed three-dimensional modules can further form a three-dimensional and efficient receiver.

The above sunlight collecting system is characterized in that the heat receiving portion is formed of a plurality of the plate-shaped modules joined with each other in a plate shape, and the plate-shaped modules each tilt down from the upper header to the lower header.

Because of this structure, the receiver (heat receiving portion) can be formed by assembling the plate-shaped modules, and thus the costs of manufacturing and transporting the receiver can be suppressed. In addition, the receiver is formed to be a plate-shaped receiver which tilts from the upper headers to the lower headers, and thus the heating medium circulating in the modules can be easily recovered in an emergency.

The above sunlight collecting system is characterized in that the heat receiving portion is formed of a plurality of the plate-shaped modules joined with each other in a substantially V-shape, and the plate-shaped modules each tilt down from the upper header to the lower header.

Because of this structure, sunlight incident on the receiver (heat receiving portion) can be re-reflected inside the V-shape. Thus, energy of sunlight can be efficiently transmitted to the heating medium circulating in the modules. In other words, efficiency of recovering energy can be improved.

The above sunlight collecting system is characterized in that the heat receiving portion is formed to be a pot-shaped receiving portion by joining side portions of the three-dimensional modules to each other.

Because of this structure, the pot-shaped receiver having high efficiency of recovering energy of sunlight can be formed by assembling the multiple modules. Thus, the pot-shaped receiver is a receiver achieving significant suppression of the costs of manufacturing, transporting, and repairing the receiver even though the receiver has energy recovery efficiency as high as the conventional receiver.

Effects of the Invention

The present invention can provide a sunlight collecting system achieving suppression of power generation cost with the receiver which enables suppressing the manufacturing, facilitating recovery work in the case of occurrence of a failure, and promptly recovering a heating medium circulating inside the receiver in an emergency.

MODES FOR CARRYING OUT THE INVENTION

Figure 1:
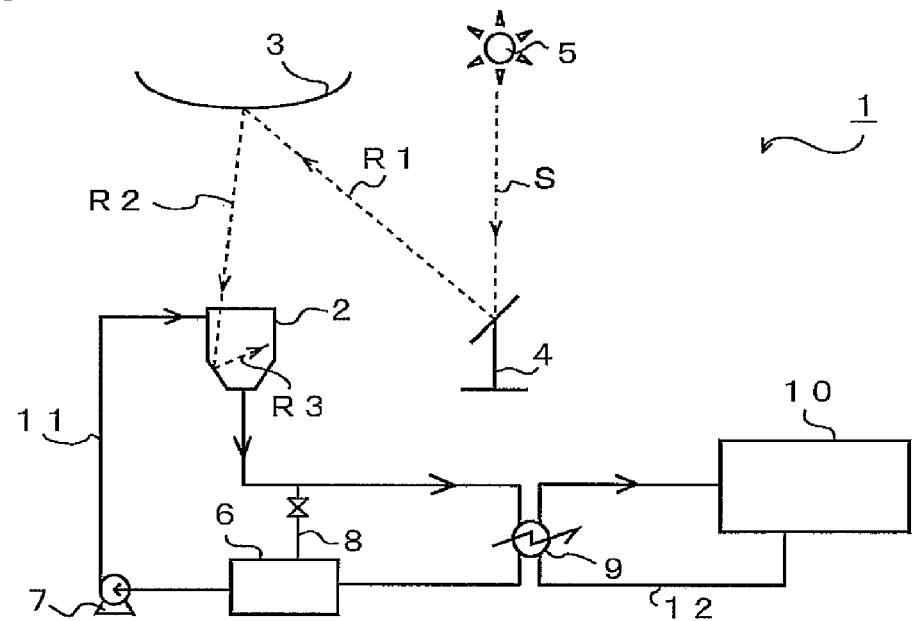
FIG. 1 is a diagram schematically showing a beam-down sunlight collecting system according to an embodiment of the present invention.

Hereinbelow, a receiver (heat receiving portion) in a sunlight collecting system according to the present invention and a method of manufacturing the receiver are described with reference to the drawings. FIG. 1 shows a configuration of a beam-down sunlight collecting system 1 according to an embodiment of the present invention. Note that although a beam-down sunlight collecting system is described below, the present invention can be implemented to a central tower sunlight collecting system in which the receiver is installed on an upper portion of a tower-shaped construction, in addition to the beam-down sunlight collecting system.

First, an overview of the sunlight collecting system 1 is described. The sunlight collecting system 1 is configured as follows. Sunlight S radiated from the sun 5 is reflected by a heliostat (reflection mirror) 4 (reflected light R1), then re-reflected by a center reflector (large reflection mirror) 3 (reflected light R2), and then converged to a receiver (heat receiving portion) 2. Sunlight S repeats reflection inside the receiver 2 (reflected light R3). A heating medium circulating in the receiver 2 absorbs thermal energy of sunlight S.

The heating medium is supplied from a heating medium tank 6 through a pump 7 and a heating medium line 11 to the receiver 2. The heating medium having absorbed the energy of sunlight S in the receiver 2 is returned to the heating medium tank 6 through a heat exchanger 9.

The heat exchanger 9 transfers the thermal energy of the heating medium to water circulating in a steam line 12. Electricity is generated by supplying the water (steam) to a steam power generator 10 having a steam turbine and the like.

When molten salt including sodium nitrate and the like is used for the heating medium, all the molten salt may be controlled to be recovered into the heating medium tank 6 after sunset. This is to avoid the problem that the molten salt is solidified inside the receiver 2 and other places to cause clogging because of the temperature drop of the receiver after sunset.

Further, the sunlight collecting system 1 is configured such that the heating medium can be recovered into the heating medium tank 6 by using an emergency line 8 when the heating medium needs to be recovered urgently due to a sudden change in the weather (in a cloudy weather), breakage of the receiver 2, and the like. Here, it is preferable to place the heating medium tank 6 at a position lower than the receiver 2 and to have such a positional relationship that the heating medium can be recovered into the heating medium tank 6 by gravity.

Next, the structure of the receiver 2 is described, the receiver 2 employed in the present invention for increasing power generation efficiency in the beam-down sunlight collecting system 1 and for achieving reduction of the costs of transportation, installation, and repair of the system. Note that the receiver 2 is formed as an assembly of multiple modules 20 in the present invention.

Figure 2:
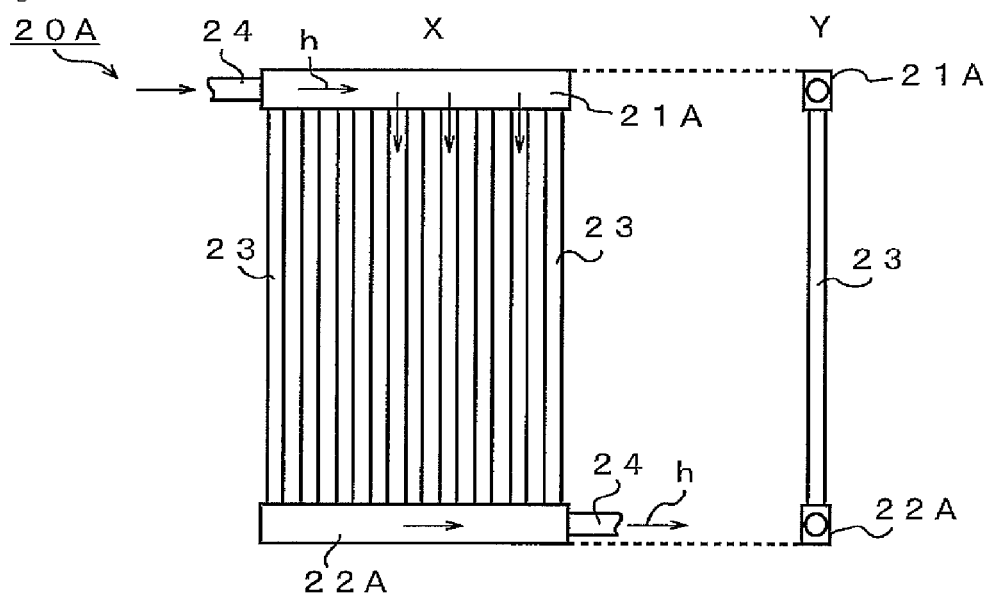
FIG. 2 is a view schematically showing a plate-shaped module according to an embodiment of the present invention.

FIG. 2 shows a plate-shaped module 20A as an example of the module 20 constituting the receiver 2, with a front view X and a side view Y illustrated schematically. The plate-shaped module 20A is configured to run a heating medium h received from an interconnecting tube 24 from an upper header 21A through heat receiving tubes 23 to a lower header 22A, and then supplies the heating medium h to the next module through another interconnecting tube 24. Note that the arrows show the flows of the heating medium h.

In FIG. 2, the interconnecting tubes 24 are shown respectively on the sides of the headers 21, 22. However, the interconnecting tubes 24 may be placed on the top or at the bottom depending on the direction to which the module 20 is joined. In addition, a gap between each two adjacent heat receiving tubes 23 is shown in FIG. 2 for convenience sake, and the narrowest possible gaps increase efficiency of recovering heat from sunlight. However, the gaps need to be wide enough to prevent the heat receiving tubes 23 from being broken by swelling because the receiver 2 may be exposed to a high temperature of 600° C. to 700° C.

Figure 3:
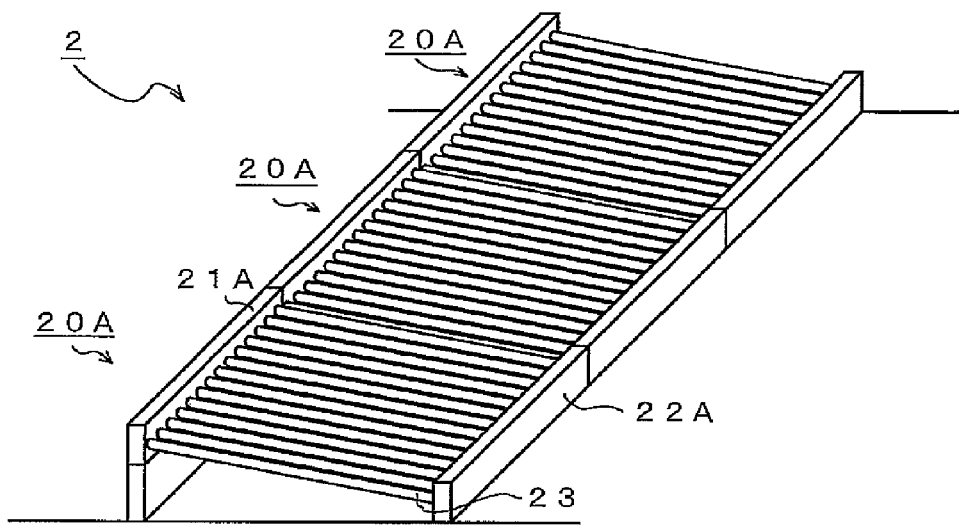
FIG. 3 is a schematic view showing a receiver according to the embodiment of the present invention.

FIG. 3 shows an example of the receiver 2 formed by assembling the plate-shaped modules 20A. The receiver 2 is formed such that the plate-shaped modules 20A are joined with each other on a plane and a slight tilt angle is formed from the upper header 21A to the lower header 21A. This tilt angle is an angle which enables recovering the heating medium h promptly without any motive power, namely, an angle enough to let the heating medium h to flow down in the plate-shaped modules 20A under its own weight.

Because of this structure, the manufacture and transportation of the receiver 2 can be achieved by manufacturing and transporting the multiple plate-shaped modules 20A separately. Accordingly, compared with a pot-shaped receiver with a diameter of 8 m to 10 m described in Patent Document 2, the plate-shaped module 20A of 2 m to 4 m wide and 5 m to 10 m long for example has significantly improved transportability. Moreover, the receiver 2 is formed by the work of assembling the plate-shaped modules 20A on a site where the sunlight collecting system 1 is constructed, and thus the work is facilitated and the costs of transporting and installing the receiver 2 are suppressed.

Moreover, only a plate-shaped module 20A having a failure portion needs to be replaced at the time of failure such as a breakage of the heat receiving tube 23, and thus repair work is simple and is performed at low cost because the replacement parts cost is for only one module.

Further, the receiver 2 is installed such that the upper headers 21A are located higher than the lower headers 22A, and thus the heating medium h circulating in the heat receiving tubes 23 can be recovered easily and promptly in an emergency.

Figure 4:
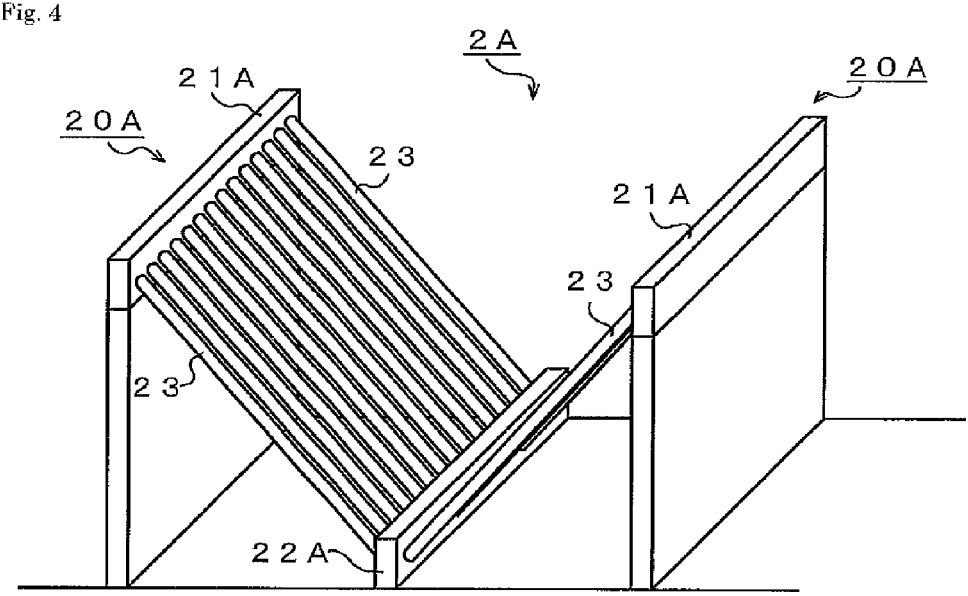
FIG. 4 is a schematic view showing a V-shaped receiver according to another embodiment of the present invention.

FIG. 4 schematically shows a V-shaped receiver 2A formed by assembling the plate-shaped modules 20A. The plate-shaped modules 20A are joined with each other at the lower headers 22A and assembled such that the upper headers 21A are located higher than the lower headers 22A. The receiver 2A is configured such that sunlight incident on the inside of the receiver 2A is re-reflected to strike the heat receiving tubes 23 multiple times, and thus the efficiency of recovering solar energy can be improved.

Note that forms of assembly of the plate-shaped modules 20A for the receivers 2, 2A shown in FIGS. 3 and 4 are not limited to these, and a larger number of plate-shaped modules 20A may be assembled to form the receiver. The receiver can be formed by assembling plate-shaped modules 20A in various forms depending on the sizes and the number of the plate-shaped modules 20A. For example, the plate-shaped modules 20A may be assembled into a box shape open at the top, or the receiver may be a large V-shaped receiver of which one side is formed of nine modules 20A. Here, joining multiple modules with each other into multiple separate groups instead of joining the multiple modules into one can suppress uneven heating by sunlight.

Figure 5:
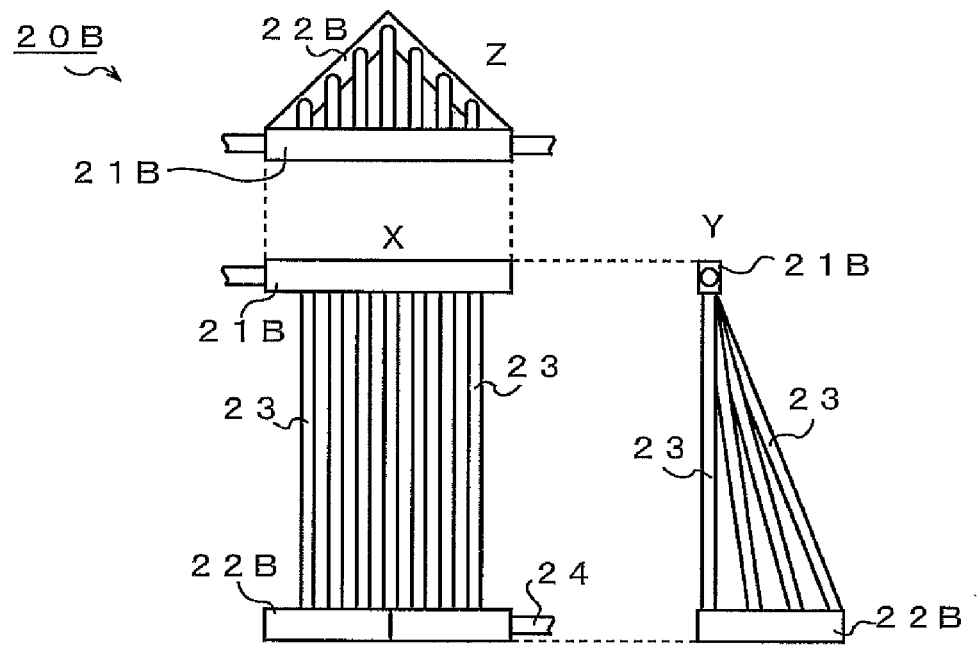
FIG. 5 is a three orthographic view showing a three-dimensional module according to yet another embodiment of the present invention.

FIG. 5 schematically shows a three-dimensional module 20B made by improving the plate-shaped module 20A. The three-dimensional module 20B includes a linear upper header 21B and a lower header 22B which is formed in a substantially triangular shape in a planar view Z, the triangular shape having two bottom corners at the opposite ends of the lower header and a vertex at the center. The three-dimensional module 20B has a substantially quadrangular shape in a front view X and has a substantially triangular shape in a side view Y. Due to the bent lower header 22B, the heat receiving tube 23 is arranged to form a line near the upper header 21B, but is arranged to shift forward and backward to form a curved line together near the lower header 22B. Because of this structure, the module can be formed three-dimensionally, and thereby a three-dimensional receiver can be formed easily by assembling the modules.

Figure 6:
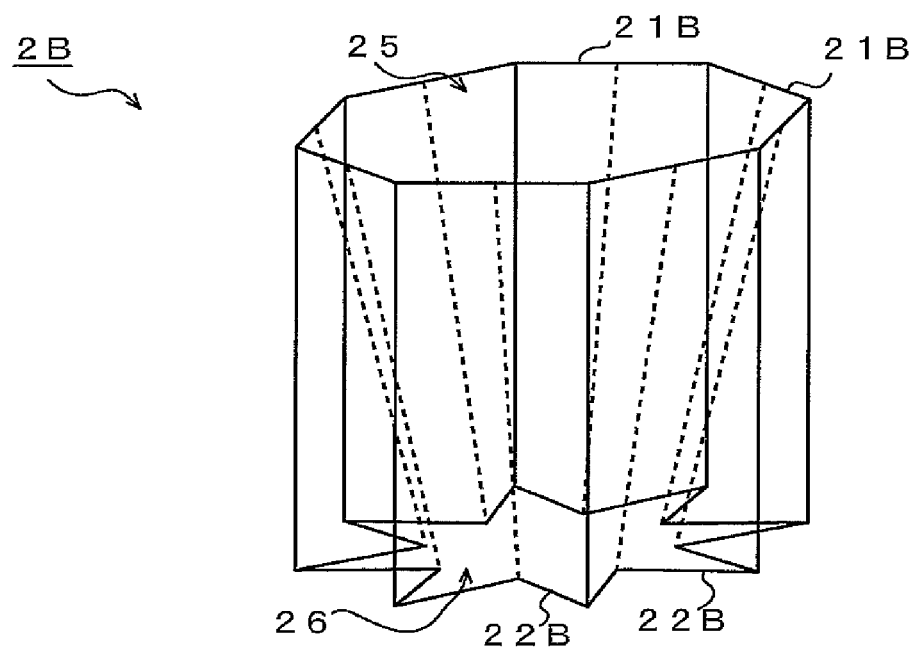
FIG. 6 is a schematic view of a pot-shaped receiver according to the yet another embodiment of the present invention.

Specifically, as shown in FIG. 6, a pot-shaped receiver 2B can be formed by joining the upper headers 21B of the three-dimensional modules 20B with each other in a circular shape, as well as similarly joining the lower headers 22B with each other in a circular shape. FIG. 6 depicts the three-dimensional receiver 2B with outer edges of the three-dimensional modules 20B.

Here, an upper opening portion 25 of the pot-shaped receiver 2B is formed in a polygonal shape (an octagon in FIG. 6) by joining the upper headers 21B with each other in a circular shape. A bottom surface portion 26 on a lower portion of the receiver 2B is formed in a star shape by joining the lower headers 22B with each other in a circular shape.

Sunlight incident from the opening portion 25 can be reflected multiple times inside the pot-shaped receiver 2B, and thus efficiency of recovering solar energy can be increased dramatically.

Figure 7:
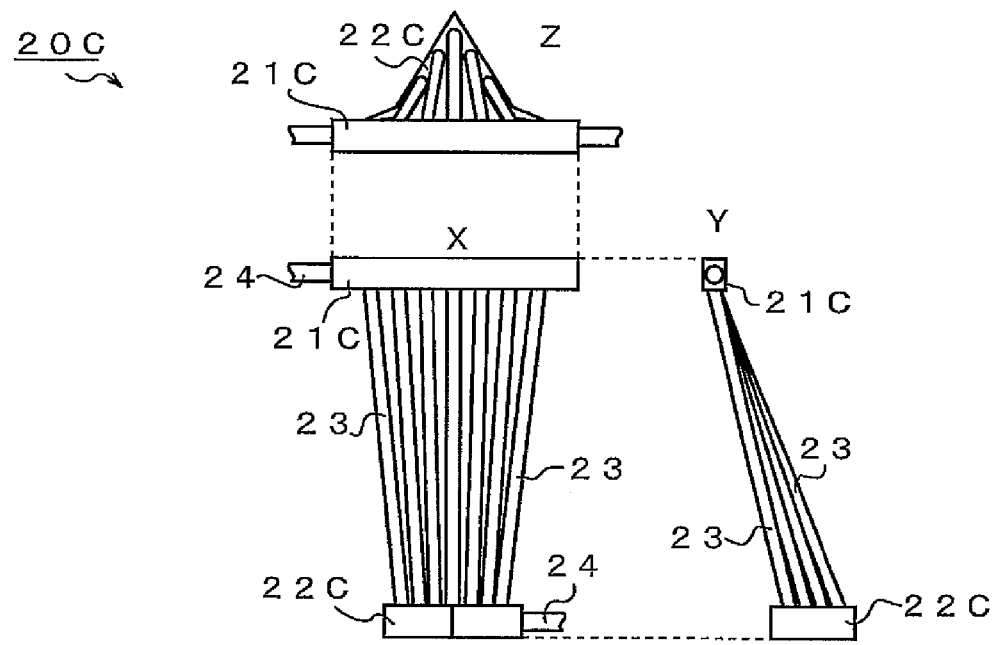
FIG. 7 is a three orthographic view showing a squeezed module according to still another embodiment of the present invention.

FIG. 7 schematically shows a squeezed module 20C made by improving the three-dimensional module 20B. The squeezed module 20C includes a linear upper header 21C and a lower header 22C which is formed in a substantially triangular shape in a planar view Z, the triangular shape having two bottom corners at the opposite ends of the lower header and a vertex at the center. Further, the squeezed module 20C is structured such that a linear distance between opposite ends of the lower header 22C is shorter than a linear distance between opposite ends of the upper header 21C. The squeezed module 20C has a trapezoidal shape in which a lower base is shorter than an upper base. Because of this structure, the module can be formed three-dimensionally, and thereby a three-dimensional receiver can be formed easily by assembling the modules.

Figure 8:
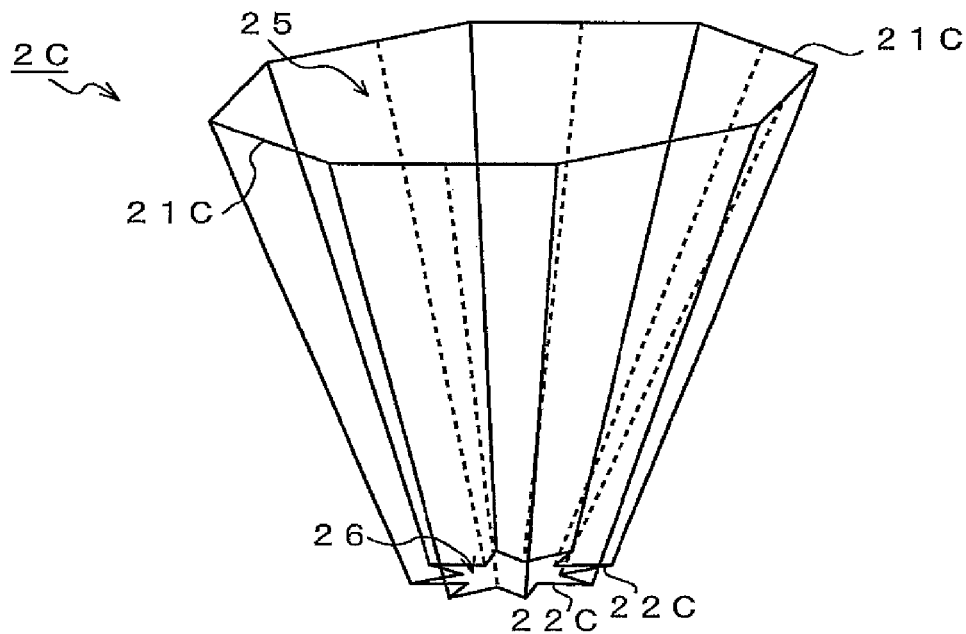
FIG. 8 is a schematic view of a squeezed receiver according to the still another embodiment of the present invention.

Specifically, as shown in FIG. 8, a squeezed receiver 2C can be formed by joining the upper headers 21C of the squeezed modules 20C with each other in a circular shape, as well as similarly joining the lower headers 22C with each other in a circular shape. FIG. 8 depicts the squeezed receiver 2C with outer edges of the squeezed modules 20C.

Here, an upper opening portion 25 of the squeezed receiver 2C is formed in a polygonal shape (an octagon in FIG. 8) by joining the upper headers 21C with each other in a circular shape. A bottom surface portion 26 on a lower portion of the receiver 2C is formed in a star shape by joining the lower headers 22C with each other in a circular shape.

The bottom surface portion 26 of the squeezed receiver 2C is squeezed narrow compared with the opening portion 25, and thus sunlight incident on the receiver increases and the area of the bottom surface portion 26 recovering no solar energy can be reduced. Accordingly, efficiency of recovering solar energy can be further improved.

Figure 9:
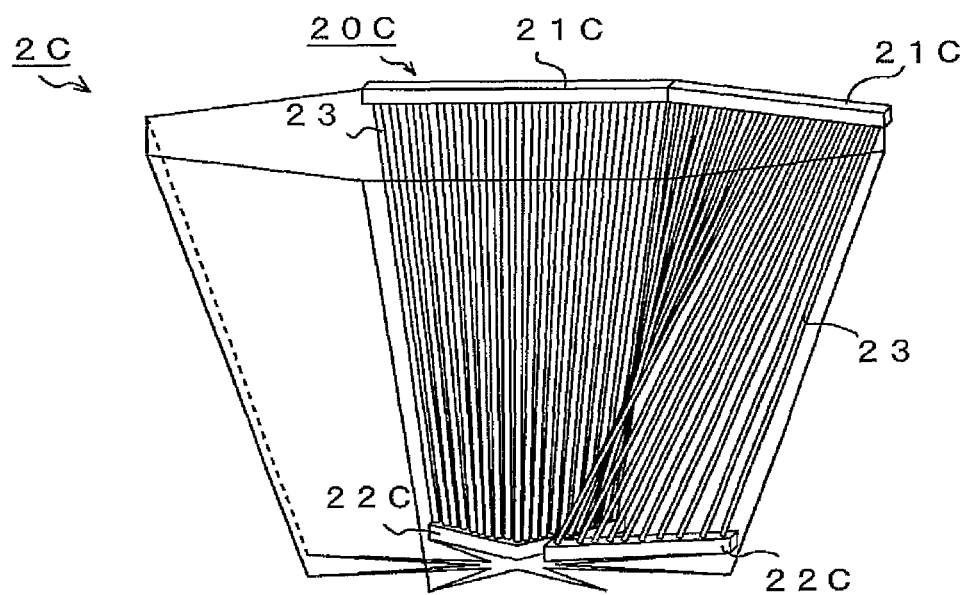
FIG. 9 is a schematic view of the squeezed receiver according to the still another embodiment of the present invention.

FIG. 9 schematically shows the squeezed receiver 2C. FIG. 9 shows the squeezed modules 20C each formed by installing multiple heat receiving tubes 23 such that the heat receiving tubes 23 are shifted as extending from the linear upper header 21C toward the bent lower header 22C.

Note that, in the module 20, any shape such as a linear shape, a bent shape, and a curved shape can be selected for the shapes of the upper header 21 and the lower header 22. The module 20 can be formed by installing the multiple heat receiving tubes 23 in conformity with the shapes of the upper header 21 and the lower header 22. When forming the receiver by assembling the modules 20, the receiver is preferably formed such that the heating medium in the modules 20 can be recovered promptly by assembling the modules 20 such that the upper headers 21 are located higher than the lower headers 22.

Note that a heat insulator may be installed on the back surface (opposite side from light receiving surface of sunlight) of the modules 20A, 20B, and 20C. The heat insulator can prevent heat dissipation of the heating medium h circulating in the modules. Alternatively, the module 20 may be structured such that a reflection mirror is installed on the back surface of the module 20. Because of this structure, sunlight coming through gaps between the heat receiving tubes 23 can be reflected on the heat receiving tubes 23, and thus efficiency of recovering solar energy can be improved. Note that a reflection mirror having a paraboloid having a focal point on the heat receiving tubes 23 can further improve recovery efficiency.

EXPLANATION OF REFERENCE NUMERALS 1 beam-down sunlight collecting system
2 receiver (heat receiving portion)
2A V-shaped receiver
2B pot-shaped receiver
2C squeezed receiver
3 center reflector
4 heliostat
20 module
20A plate-shaped module
20B three-dimensional module
20C squeezed module
21A, 21B, 21C upper header
22A, 22B, 22C lower header
23 heat receiving tube
24 interconnecting tube
h heating medium
S sunlight
R1 reflected light
R2 re-reflected light
R3 reflected light inside receiver

What is claimed is:

1. A sunlight collecting system in which sunlight is reflected by a plurity of heliostats onto a heat receiving portion having a heating medium circulated therein and then energy is drawn from the heating medium, characterized in that
    the sunlight collecting system is configured such that:
        the heat receiving portion is formed by assembling a plurality of modules,
        each of the modules includes an upper header having a linear shape, a lower header, and plurality of heat receiving tubes connecting the two headers,
        each module is a three-dimensional module formed such that the lower header is formed in a substantially chevron shape in a horizontal planar view, the chevron shape having two bottom corners at the opposite ends of the lower header and a vertex at the center, and
        each module is having a substantially quadrangular shape in a front view by including the upper header, the lower header, and the plurality of heat receiving tubes connecting the upper header and the lower header wherein adjacent the upper header the heat receiving tubes are aligned in a substantially straight line and wherein adjacent the lower header the heat receiving tubes are aligned in a substantially chevron shape formation; and wherein the modules are connected such that the upper headers are connected together forming a polygon and the lower headers are connected forming a star shape, and
        the heating medium circulates in the modules.

2. A sunlight collecting system in which sunlight is reflected by a plurality of heliostats onto a heat receiving portion having a heating medium circulated therein and then energy is drawn from the heating medium, characterized in that
    the sunlight collecting system is configured such that:
        the heat receiving portin is formed by assembling a plurality of modules, each of the modules includes an upper header having a linear shape, a lower header, and plurality of heat receiving receiving tubes connecting the two headers.

each module is a three-dimensional module formed such that the lower header is formed in a substantially chevron shape in a horizontal planar view, the chevron shape having two bottom corners at the opposite ends of the lower header and a vertex at the center, each of the modules is having a substantially quadrangular shape in a front view by including the upper header, the lower header, and the plurality of heat receiving tubes connecting the upper header and the lower header, each three-dimensional module is formed such that a linear distance between the opposite ends of the lower header is shorter than that between the opposite ends of the upper header wherein adjacent the upper header the heat receiving tubes are aligned in a substantially straight line and wherein adjacent the lower header the heat receiving tubes are aligned in a substantially chevron shape formation; and wherein the modules are connected such that the upper headers are connected together forming a polygon and the lower headers are connected forming a star shape, and the heating medium circulates in the modules.

3. A sunlight collecting system in which sunlight is reflected by a plurality of helioststs onto a heat receiving portion having heating medium circulated therein and then energy is drawn from the heating medium, characterized in that the sunlight collecting system is configured such that:

the heat receiving portion is formed by assembling a plurality of modules, each of the modules includes an upper header having a linear shape, a lower header, and a plurality of heat receiving tubes connecting the two headers, each module is a three-dimensional module formed such that the lower header is formed in a substantially chevron shape in a horizontal planar view, the chevron shape having two bottom corners at the opposite ends of the lower header and a vertex at the center, each of the modules is having a substantially quadrangular shape in a front view by including the upper header, the lower header wherein adjacent the upper header the heat receiving tubes are aligned in a substantially straight line and wherein adjacent the lower header the heat receiving tubes are aligned in a substantially chevron shape formation; and wherein the modules are connected such that the upper headers are connected together forming a polygon and the lower headers are connected forming a star shape, and the plurality of heat receiving tubes connecting the upper header and the lower header, the heat receiving portion is formed to be a pot-shaped receiving portion by joining side portions of the three-dimensional modules to each other, and the heating medium circulates in the modules.

* * * * *